United States Patent
Gaddi et al.

(10) Patent No.: US 8,829,113 B2
(45) Date of Patent: *Sep. 9, 2014

(54) AUTOMOTIVE INTERIOR ELEMENT

(75) Inventors: Benedetta Gaddi, Ferrara (IT); Marco Ciarafoni, Ferrara (IT); Mara Destro, Bologna (IT); Ofelia Fusco, Ferrara (IT); Paola Massari, Ferrara (IT); Ines Mingozzi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/877,562

(22) PCT Filed: Oct. 12, 2011

(86) PCT No.: PCT/EP2011/067793
§ 371 (c)(1),
(2), (4) Date: Apr. 3, 2013

(87) PCT Pub. No.: WO2012/049204
PCT Pub. Date: Apr. 19, 2012

(65) Prior Publication Data
US 2013/0211011 A1     Aug. 15, 2013

Related U.S. Application Data

(60) Provisional application No. 61/405,687, filed on Oct. 22, 2010.

(30) Foreign Application Priority Data

Oct. 14, 2010 (EP) .................... 10187612

(51) Int. Cl.
C08F 8/00      (2006.01)
C08L 23/06     (2006.01)
C08L 23/10     (2006.01)
C08L 23/12     (2006.01)
C08L 23/14     (2006.01)
C08F 210/06    (2006.01)
C08L 23/16     (2006.01)
C08L 23/08     (2006.01)

(52) U.S. Cl.
CPC ............ *C08L 23/12* (2013.01); *C08L 23/16* (2013.01); *C08L 2205/02* (2013.01); *C08L 23/14* (2013.01); *C08L 23/0815* (2013.01); *C08F 210/06* (2013.01)
USPC .......................................... 525/191; 525/240

(58) Field of Classification Search
USPC .................................. 525/191, 240
See application file for complete search history.

(56) References Cited

U.S. PATENT DOCUMENTS

| 7,772,324 | B2 * | 8/2010 | Massari et al. ............... 525/191 |
| 7,795,352 | B2 * | 9/2010 | Massari et al. ............... 525/240 |
| 7,872,074 | B2 * | 1/2011 | Massari et al. ............... 525/191 |
| 2011/0060085 | A1 | 3/2011 | Gahleitner et al. |
| 2011/0118396 | A1 | 5/2011 | Sauer et al. |
| 2012/0232221 | A1 | 9/2012 | Collina et al. |

OTHER PUBLICATIONS

PCT International Search Report & Written Opinion mailed Dec. 27, 2011, for PCT/EP2011/067793.

* cited by examiner

*Primary Examiner* — Nathan M Nutter

(57) ABSTRACT

Automotive interior element comprising a polypropylene composition comprising (percent by weight): A) from 60% to 90% of a propylene homopolymer having: i) a polydispersity Index (P.I.) value of from 3.5 to 10.0; ii) a fraction insoluble in xylene at 25° C., higher than 90%; and iii) a MFR L (Melt Flow Rate according to ISO 1133, condition L, i.e. 230° C. and 2.16 kg load) from 50 to 200 g/10 min; B) from 10% to 40%; of a copolymer of propylene with from 30% to 60% of ethylene derived units; the composition having an intrinsic viscosity of the fraction soluble in xylene at 25° C. comprised between 2.5 and 4.0 dl/g; a MFR L (Melt Flow Rate according to ISO 1133, condition L, i.e. 230° C. and 2.16 kg load) from 15 to 100 g/10 min and all the three values of carbon emission measured according to VDA 227 (C-emission) are lower than 30.0 µgC/g; wherein the values of carbon emission are measured in the ex reactor propylene composition.

4 Claims, No Drawings

AUTOMOTIVE INTERIOR ELEMENT

This application is the U.S. National Phase of PCT International Application PCT/EP2011/067793, filed Oct. 12, 2011, claiming priority of European Patent Application No. 10187612.6, filed Oct. 14, 2010 and the benefit under 35 U.S.C. 119(e) of U.S. Provisional Application No. 61/405,687, filed Oct. 22, 2010, the contents of which are incorporated herein by reference in their entirety.

The present invention relates to an automotive interior element comprising a propylene polymer having particular features.

Polypropylene is the material of choice for many applications. For instance polypropylene compositions are used in articles in the automotive interior. Said compositions are—generally speaking—good processable and can be individually customized. A problem of the propylene composition used in automotive interior can be the malodor or generally speaking the presence of high amount of volatile compounds in the polymer that can be dangerous for the health. The presence of these volatile compounds is the responsible of the classic odor of the interior of a new car. Thus it is desirable to reduce the amount of headspace emission according to VDA 277.

EP 2 141 193 relates to a polymer composition comprising polypropylene, talc, organic antioxidants, and carbonyl compounds wherein the carbonyl compounds have the function to reduce the presence of volatile compounds.

The applicant found that when a particularly polymerization process is used a polypropylene composition having very low content of carbon emission measured according to VDA 277 and at the same time good physical mechanical features is obtaine. The obtained material can therefore be used for the production of automotive interior elements.

An object of the present invention is an automotive interior element comprising a polypropylene composition comprising (percent by weight):
A) from 60% to 90%; preferably from 70% to 85%; more preferably from 77%-82%, of a propylene homopolymer having:
  i) a polydispersity Index (P.I.) value of from 3.5 to 10.0 preferably from 4.6 to 10.0, more preferably from 5.1 to 8;
  ii) a fraction insoluble in xylene at 25° C., higher than 90%, preferably higher than 95% more preferably higher than 97%; and
  iii) a MFR L (Melt Flow Rate according to ISO 1133, condition L, i.e. 230° C. and 2.16 kg load) from 50 to 200 g/10 min preferably from 110 to 200 g/10 min, more preferably from 120 to 180 g/10 min, even more preferably from 130 to 160 g/10 min;
B) from 10% to 40%; preferably from 15% to 30%; more preferably from 18% to 23%, of a copolymer of propylene with from 30% to 60%, preferably from 35% to 50%, more preferably from 39% to 48%, even more preferably from 39% to 45% of ethylene derived units;
the composition having an intrinsic viscosity of the fraction soluble in xylene at 25° C. comprised between 2.5 and 4.0 dl/g; preferably between 2.7 and 4.0 dl/g more preferably between 3.0 and 3.5 dl/g; a MFR L (Melt Flow Rate according to ISO 1133, condition L, i.e. 230° C. and 2.16 kg load) from 15 to 100 g/10 min preferably from 25 to 70 g/10 min more preferably from 45 to 60 g/10 min; and all the three values of carbon emission measured according to VDA 227 (C-emission) are lower than 30.0 µgC/g; preferably they are lower than 20.0 µgC/g; more preferably they are lower than 15.0 µgC/g; even more preferably they are lower than 14.0 µgC/g; wherein the values of carbon emission are measured in the ex reactor polypropylene composition.

For ex reactor propylene composition it is meant the polymer powder before the pellettization, i.e. the polymer powder that has never been melt.

For automotive interior element it is meant all the interior parts of automotive in particular door handles, door pockets, trim and parcel shelves, air ducts, heater/air conditioning unit casings, armatures for fascia panels, centre consoles, carpeting.

said polypropylene composition being obtainable with a polymerization process carried out in the presence of a catalyst system comprising the product obtained by contacting (a) a solid catalyst component having average particle size ranging from 15 to 80 µm comprising a magnesium halide, a titanium compound having at least a Ti-halogen bond and at least two electron donor compounds one of which being present in an amount from 50 to 90% by mol with respect to the total amount of donors and selected from succinates and the other being selected from 1,3 diethers, (b) an aluminum hydrocarbyl compound and optionally (c) an external electron donor compound.

Preferably said process comprising the following steps:
  (i) optionally contacting the catalyst components (a), (b) and optionally (c) for a period of time ranging from 0.1 to 120 minutes, at a temperature ranging from 0 to 90° C.;
  (ii) polymerizing propylene producing a propylene polymer and
  (iii) in a successive step, carried out in gas-phase, in the presence of the product coming from (ii), polymerizing mixtures of propylene and ethylene to produce a propylene copolymer.

From the above definitions it is evident that the term "copolymer" includes polymers containing only two kinds of comonomers.

The oligomer content of the polypropylene composition to be used for interior automotive element of the present invention is very low, in particular the oligomer content measured in the ex reactor polymer are lower than 5000 ppm; preferably lower than 4000 pm even more preferably lower than 3500 ppm.

Furthermore the polypropylene composition for the automotive interior element of the present invention is endowed with improved values of Izod at 23° C., 0° C. and −20° C. and maintaining a good value of flexural modulus.

Preferably the Flexural Modulus is comprised between 900 MPa and 1700 MPa, preferably comprised between 1100 and 1600 MPa;

Preferably the Izod impact strength measured at 23° C. higher than 5 kJ/m$^2$; preferably comprised between 5.2 and 20 kJ/m$^2$; more preferably comprised between 6.0 and 20 KJ/m$^2$; even more preferably comprised between 6.4 and 10 KJ/m$^2$;

Preferably the Izod impact strength measured at 0° C. higher than 4.7 kJ/m$^2$; preferably comprised between 5 and 20 kJ/m$^2$; more preferably comprised between 5.1 and 12 KJ/m$^2$' even more preferably comprised between 5.3 and 10 KJ/m$^2$;

Preferably the Izod impact strength measured at −20° C. higher than 3.8 KJ/m$^2$; preferably comprised between 4.0 and 10 KJ/m$^2$;

The very low carbon content and the low value of oligomers together with the mechanical properties render the composition of the present invention fit to be used in automotive interiors, so that to reduce the odours and the emission of volatile compounds.

Thus a further object of the present invention is the use for automotive interior of a polypropylene composition comprising (percent by weight):

A) from 60% to 90%; preferably from 70% to 85%; more preferably from 77%-82%, of a propylene homopolymer having:
   i) a polydispersity Index (P.I.) value of from 3.5 to 10.0 preferably from 4.6 to 10.0, more preferably from 5.1 to 8;
   ii) a fraction insoluble in xylene at 25° C., higher than 90%, preferably higher than 95% more preferably higher than 97%; and
   iii) a MFR L (Melt Flow Rate according to ISO 1133, condition L, i.e. 230° C. and 2.16 kg load) from 50 to 200 g/10 min preferably from 110 to 200 g/10 min, more preferably from 120 to 180 g/10 min, even more preferably from 130 to 160 g/10 min;

B) from 10% to 40%; preferably from 15% to 30%; more preferably from 18% to 23%, of a copolymer of propylene with from 30% to 60%, preferably from 35% to 50%, more preferably from 39% to 48%, even more preferably from 39% to 45% of ethylene derived units;

the composition having an intrinsic viscosity of the fraction soluble in xylene at 25° C. comprised between 2.5 and 4.0 dl/g; preferably between 2.7 and 4.0 dl/g more preferably between 3.0 and 3.5 dl/g and a MFR L (Melt Flow Rate according to ISO 1133, condition L, i.e. 230° C. and 2.16 kg load) from 15 to 100 g/10 min preferably from 25 to 70 g/10 min more preferably from 45 to 60 g/10 min:;

said propylene composition being obtained with a polymerization process carried out in the presence of a catalyst system comprising the product obtained by contacting (a) a solid catalyst component having average particle size ranging from 15 to 80 μm comprising a magnesium halide, a titanium compound having at least a Ti-halogen bond and at least two electron donor compounds one of which being present in an amount from 50 to 90% by mol with respect to the total amount of donors and selected from succinates and the other being selected from 1,3 diethers, (b) an aluminum hydrocarbyl compound and optionally (c) an external electron donor compound.

Preferably, the succinate present in the solid catalyst component (a) is selected from succinates of formula (I) below

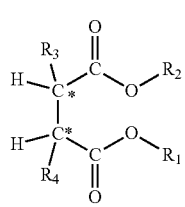

in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, C3-C20 cycloalkyl, C5-C20 aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S)

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

Particularly preferred are the compounds in which the $R_3$ and/or $R_4$ radicals are secondary alkyls like isopropyl, sec-butyl, 2-pentyl, 3-pentyl or cycloakyls like cyclohexyl, cyclopentyl, cyclohexylmethyl.

Examples of the above-mentioned compounds are the (S,R) (S,R) forms pure or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the 1,3-diethers mentioned above, particularly preferred are the compounds of formula (II)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1 -6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3 -dimethoxypropane, 2,2-diethyl-1,3-dimethoxypropane, 2,2-dipropyl- 1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane,2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, particularly preferred are the 1,3-diethers of formula (III)

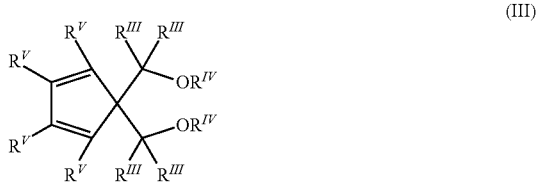

(III)

where the radicals $R^{IV}$ have the same meaning explained above and the radicals $R^{III}$ and $R^{V}$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^V$ and $R^{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Specially preferred are the compounds of formula (IV):

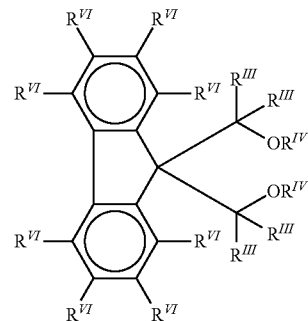

(IV)

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (III).

Specific examples of compounds comprised in formulae (III) and (IV) are:
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;

9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

As explained above, the catalyst component (a) comprises, in addition to the above electron donors, a titanium compound having at least a Ti-halogen bond and an Mg halide. The magnesium halide is preferably MgCl$_2$ in active form which is widely known from the patent literature as a support for Ziegler-Natta catalysts. Patents U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are TiCl$_4$ and TiCl$_3$; furthermore, also Ti-haloalcoholates of formula Ti(OR)$_{n-y}$X$_y$ can be used, where n is the valence of titanium, y is a number between 1 and n–1 X is halogen and R is a hydrocarbon radical having from 1 to 10 carbon atoms.

Preferably, the catalyst component (a) has an average particle size ranging from 20 to 70 µm and more preferably from 25 to 65 µm. As explained the succinate is present in an amount ranging from 50 to 90% by weight with respect to the total amount of donors. Preferably it ranges from 60 to 85% by weight and more preferably from 65 to 80% by weight. The 1,3-diether preferably constitutes the remaining amount.

The aluminum hydrocarbyl compound (b) is preferably an aluminum hydrocarbyl compound in which the hydrocarbyl is selected from C$_3$-C$_{10}$ branched aliphatic or aromatic radicals; preferably it is chosen among those in which the branched radical is an aliphatic one and more preferably from branched trialkyl aluminum compounds selected from triisopropylaluminum, tri-iso-butylaluminum, tri-iso-hexylaluminum, tri-iso-octylaluminum. It is also possible to use mixtures of branched trialkylaluminum's with alkylaluminum halides, alkylaluminum hydrides or alkylaluminum sesquichlorides such as AlEt$_2$Cl and Al$_2$Et$_3$Cl$_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula R$_a^5$R$_b^6$Si(OR$^7$)$_c$, where a and b are integer from 0 to 2, c is an integer from 1 to 3 and the sum (a+b+c) is 4; R$^5$, R$^6$, and R$^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-metil-dimethoxysilane. The external electron donor compound is used in such an amount to give a molar ratio between the organo-aluminum compound and said electron donor compound of from 5 to 500, preferably from 5 to 400 and more preferably from 10 to 200.

In step (i) the catalyst forming components are contacted with a liquid inert hydrocarbon solvent such as, e.g., propane, n-hexane or n-heptane, at a temperature below about 60° C. and preferably from about 0 to 30° C. for a time period of from about six seconds to 60 minutes.

The above catalyst components (a), (b) and optionally (c) are fed to a pre-contacting vessel, in amounts such that the weight ratio (b)/(a) is in the range of 0.1-10 and if the compound (c) is present, the weight ratio (b)/(c) is weight ratio corresponding to the molar ratio as defined above. Preferably, the said components are pre-contacted at a temperature of from 10 to 20° C. for 1-30 minutes. The precontact vessel can be either a stirred tank or a loop reactor.

Preferably, the precontacted catalyst is then fed to the pre-polymerization reactor where a prepolymerization step (i) takes place. The prepolymerization step is carried out in a first reactor selected from a loop reactor or a continuously stirred tank reactor. The prepolymerization can be carried out either in gas-phase or in liquid-phase. Preferably it is carried out in liquid-phase. The liquid medium comprises liquid alpha-olefin monomer(s), optionally with the addition of an inert hydrocarbon solvent. Said hydrocarbon solvent can be either aromatic, such as toluene, or aliphatic, such as propane, hexane, heptane, isobutane, cyclohexane and 2,2,4-trimethylpentane. The amount of hydrocarbon solvent, if any, is lower than 40% by weight with respect to the total amount of alpha-olefins, preferably lower than 20% by weight. Preferably, step (i)a is carried out in the absence of inert hydrocarbon solvents.

The average residence time in this reactor generally ranges from 2 to 40 minutes, preferably from 10 to 25 minutes. The temperature ranges between 10° C. and 50° C., preferably between 20° C. and 40° C. Adopting these conditions allows to obtain a pre-polymerization degree in the preferred range from 60 to 800 g per gram of solid catalyst component, preferably from 150 to 500 g per gram of solid catalyst component. Step (i)a is further characterized by a low concentration of solid in the slurry, typically in the range from 50 g to 300 g of solid per liter of slurry.

The slurry containing the catalyst preferably pre-polymerized is discharged from the pre-polymerization reactor and fed to the reactor where step (ii) takes place. Step (ii) can be carried out either in gas-phase or in liquid phase. The gas-phase process can be carried out in a fluidized or stirred, fixed bed reactor or in a gas-phase reactor comprising two interconnected polymerization zones one of which, working under fast fluidization conditions and the other in which the polymer flows under the action of gravity. The liquid phase process can be either in slurry, solution or bulk (liquid monomer). This latter technology is the most preferred and can be carried out in various types of reactors such as continuous stirred tank reactors, loop reactors or plug-flow ones. The polymerization is generally carried out at temperature of from 20 to 120° C., preferably of from 40 to 85° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Preferably, the step (ii) is carried out by polymerizing in liquid monomer, preferably in loop reactor, propylene, optionally in mixture with ethylene and/or C$_4$-C$_{10}$ alpha olefins, to give the propylene polymer of the required xylene insolubility.

In this stage and/or in the successive stage, hydrogen can be used as a molecular weight regulator. The propylene polymer obtained in this stage has a xylene insolubility preferably higher than 90% and more preferably higher than 95%, an isotactic index in terms of content of isotactic pentads (determined with C13-NMR on whole polymer (ii) higher than 93%, preferably higher than 95%, and more preferably higher than 97%. The Melt Flow Rate value according to ISO 1133 (230° C., 2.16 Kg) can vary within a wide range going from 0.01 to 300 g/10 min and particularly from 0.1 to 250 g/10 min.

In the subsequent stage of the particularly preferred polymerization process, the propylene/ethylene copolymer (B) is produced in a conventional fluidized-bed gas-phase reactor in the presence of the polymeric material and the catalyst system coming from the preceding polymerization step. The polymerization mixture is discharged from step (ii) sent to a gas-solid separator, and subsequently fed to the fluidized-bed gas-phase reactor operating under conventional conditions of temperature and pressure.

The process for producing the polypropylene composition to be used in automotive interior according to the present invention is preferably described in EP09176439.9.

The compositions to be used in the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as flexural modulus and HDT. Talc can also have a nucleating effect.

The automotive interior element according to the present invention can be obtained starting from the polypropylene composition described above by means of the techniques commonly known in the art, such as injection molding, thermoforming and so on.

The following examples are given to illustrate and not to limit the present invention.

EXAMPLES

The data of the propylene polymer materials were obtained according to the following methods:

Xylene-Soluble Faction 2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquots of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Ethylene (C2) Content

Ethylene content has been determined 1 by IR spectroscopy.

The spectrum of a pressed film of the polymer is recorded in absorbance vs. wavenumbers ($cm^{-1}$).

The following measurements are used to calculate C2 content:

a) Area ($A_t$) of the combination absorption bands between 4482 and 3950 $cm^{-1}$ which is used for spectrometric normalization of film thickness.

b) Area ($A_{C2}$) of the absorption band due to methylenic sequences ($CH_2$ rocking vibration) after a proper digital subtraction of an isotactic polypropylene (IPP) reference spectrum. The range 660 to 790 $cm^{-1}$ is used for both heterophasic and/or random copolymers The comonomer content of the Component B is determined on the precipitated "amorphous" fraction of the polymer. The precipitated "amorphous" fraction is obtained as follows: to one 100 ml aliquot of the filtered liquid obtained as described above (procedure for the Xylene-soluble faction) 200 ml of acetone are added under vigorous stirring. Precipitation must be complete as evidenced by a clear solid-solution separation. The solid thus obtained is filtered on a tared metallic screen and dried in a vacuum oven at 70° C. until a constant weight is reached.

Molar Ratio of Feed Gasses

Determined by gas-chromatography

Melt Flow Rate (MFR)

Determined according to ISO 1133 (230° C., 2.16 Kg)

Intrinsic Viscosity

Determined in tetrahydronaphthalene at 135° C.

Flexural Modulus

Determined according to ISO 178

Stress at Yield and at Break

Determined according to ISO 527

Elongation at Yield and Break

Determined according to ISO 527

IZOD Impact Strength

Determined according to ISO 18011A

Melting Temperature, Melting Enthalpy and Crystallization Temperature

Determined by differential scanning calorimetry (DSC). weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures and crystallization temperatures are read.

Polydispersity Index (PI): measurement of molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation})^{-1.76}$$

wherein the modulus separation (MS) is defined as:

$$MS = (\text{frequency at } G' = 500 \text{ Pa})/(\text{frequency at } G'' = 500 \text{ Pa})$$

wherein G' is the storage modulus and G" is the loss modulus.

Carbon Emission

Determined according VDA 277:1995

Oligomer Content

The determination of oligomer content by solvent extraction consists of treating 5 g of polypropylene sample with 10 ml of methylendichloride ($CH_2Cl_2$) into the vial. Oligomers from the sample are extracted by placing the vial into the ultrasonic bath at 25° C. for 4 hours. 1 µl of the extracted solution is injected into capillary column and analysed by using FID, without any filtration. For quantitative estimation of oligomer content a calibration based on external standard method has been applied. In particular a series of hydrocarbon (C12-C22-C28-C40) have been used.

Example 1

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2 \cdot 2.1C_2H_5OH$ having average particle size of 47 µm (prepared in accordance with the method described in example 1 of EP728769, an amount of diethyl 2,3-diisopropylsuccinate in racemic form such as to have a Mg/succinate molar ratio of 12 was added. The temperature was raised to 100° C. and kept at this value for 60 min. After that the stirring was stopped, the liquid siphoned off and the treatment with TiCl4 was repeated at 110° C. for 30 min. After siphoning, fresh $TiCl_4$ and an amount of 9,9-bis(methoxymethyl)fluorene such as to have a Mg/diether molar ratio of 24 were added. Then the temperature was raised to 90° C. for 30min. After sedimentation and siphoning at 85° C. the solid was washed six times with anhydrous hexane (6×100 ml) at 60° C.

Catalyst System and Prepolymerization Treatment

Before introducing it into the polymerization reactors, the solid catalyst component described above is contacted with aluminum triisobutyl (Tibal) and dicyclopentyldimethoxysilane (DCPMS) at a temperature of 15° C. under the conditions reported in Table 1. In comparison example 1 TEAL was used instead of TEAL.

The catalyst system is then subject to prepolymerization at 20° C. by maintaining it in suspension in liquid propylene before introducing it into the first polymerization reactor.

Polymerization

The polymerization run is carried out in continuous mode in a series of two reactors equipped with devices to transfer the product from one reactor to the one immediately next to it. The first reactor is a liquid phase loop reactor, and the second is a fluidized bed gas-phase reactor. A propylene homopolymer is prepared in the liquid loop reactor while an ethylene copolymer is prepared in the gas-phase reactor in the presence of the propylene homopolymer coming from the first stage. Hydrogen is used as molecular weight regulator.

The gas phase (propylene, ethylene and hydrogen) is continuously analyzed via gas-chromatography.

At the end of the run the powder is discharged and dried under a nitrogen flow.

The main polymerization conditions and the analytical data relating to the polymers produced in the three reactors are reported in Table 1. Properties of the polymer are reported on table 2.

Comparative Example 2

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2 * 2.8C_2H_5OH$ (prepared according to the method described in ex. 2 of U.S. Pat. No. 4,399,054 but operating at 3000 rpm instead of 10000 rpm) and 7.4 mmol of diethyl 2,3-diisopropylsuccinate were added. The temperature was raised to 100° C. and maintained for 120 min. Then, the stirring was discontinued, the solid product was allowed to settle and the supernatant liquid was siphoned off. Then 250 mL of fresh $TiCl_4$ were added. The mixture was reacted at 120° C. for 60 min and, then, the supernatant liquid was siphoned off. The solid was washed six times with anhydrous hexane (6×100 mL) at 60° C.

Catalyst System and Prepolymerization Treatment

Before introducing it into the polymerization reactors, the solid catalyst component described above is contacted at 12° C. for 24 minutes with aluminum triethyl (TEAL) and dicyclopentyldimethoxysilane (DCPMS). The weight ratio of TEAL to the solid catalyst component in indicated in table 1, the weight ratio TEAL/DCPMS is indicated in table 1.

The catalyst system is then subjected to prepolymerization by maintaining it in suspension in liquid propylene at 20° C. for about 5 minutes before introducing it into the first polymerization reactor.

Polymerization

The polymerization was carried out by using the same procedure of example 1. The main polymerization conditions and the analytical data relating to the polymers produced in the three reactors are reported in Table 1. Properties of the polymer are reported on table 2.

TABLE 1

| PROCESS CONDITIONS | Ex. 1 | Comp Ex. 2 |
|---|---|---|
| Precontact | | |
| Temperature ° C. | 15 | 15 |
| Residence time (min) | 24 | 24 |
| Teal/donor ratio | 5 | 5 |
| Prepolymerization | | |
| Temperature ° C. | 20 | 20 |
| Residence time (min) | 9 | 8.5 |
| Pre-polymerization degree g/gcat | 350 | 380 |
| Loop 1$^{st}$ reactor in liquid phase - propylene homopolymer | | |
| Temperature, ° C. | 75 | 75 |
| Pressure, bar | 40 | 40 |
| Residence time, min | 64 | 50 |
| $H_2$ feed mol ppm | 6700 | 8100 |
| Xylene Solubles % | 1.9 | 2.0 |
| Split, wt % | 79 | 79 |
| Gas-Phase reactor - ethylene/propylene copolymerization | | |
| Temperature, ° C. | 80 | 80 |
| Pressure, bar | 15 | 16 |
| Residence time, min | 29 | 22 |
| $C_2^-/C_2^- + C_3^-$, % | 0.27 | 0.28 |
| $H_2/C_2^-$, % | 0.059 | 0.047 |
| Split, wt % | 20 | 19 |
| % C2− in copolymer | 44 | 40 |

C2− = ethylene; C3− = propylene; H2 = hydrogen

TABLE 2

| Example | | Ex. 1 | Comp ex. 2 |
|---|---|---|---|
| Component A) | | | |
| Homopolymer content | % | 80 | 81 |
| MFR "L" | g/10' | 138 | 140 |
| Xylene soluble fraction | wt % | 2.2 | 2.7 |
| Component B) | | | |
| Copolymer content | wt % | 20 | 19 |
| Ethylene content in component b) | wt % | 44 | 40 |
| Intrinsic viscosity of the Xylene soluble fraction | dl/g | 3.20 | 3.11 |

TABLE 2-continued

| Example | | Ex. 1 | Comp ex. 2 |
|---|---|---|---|
| Property of the composition | | | |
| Ethylene content | wt % | 9 | 7.7 |
| Xylene - soluble fraction | wt % | 19 | 19.3 |
| MFR | g/10' | 55 | 53 |
| Flexural Modulus | MPa | 1450 | 1455 |
| Izod at 23° C. | KJ/m2 | 7.2 | 6.5 |
| Izod at 0° C. | KJ/m2 | 5.5 | 5.4 |
| Izod at −20° C. | KJ/m2 | 4.2 | 4.2 |
| Tens. Str. @ yield | MPa | 24.9 | 26.1 |
| Elong. @ yield | % | 4.0 | 4.6 |
| Tens. Str. @ break | MPa | 21.2 | 18.3 |

The propylene polymers of example 1 and comparative example 1 have been tested for carbon emission content according to the method VDA 277:1995. Furthermore the oligomer content have been determined. These evaluation have been made on ex reactor polymer powders before the pellettization, i.e. the polymer powder that has never been melt. The results are reported on table 3

TABLE 3

| | | Ex 1 | Comp Ex 2 |
|---|---|---|---|
| Carbon emission | μg | 9.6/12.7/13.0 | 37.5/37.9/40.0 |
| Oligomer | ppm | 3190 | 7190 |

From table 3 results that the carbon emission and the oligomer content of the propylene composition obtained according to the present invention are considerably lower than that ones of comparative example 2 obtained by using a different catalyst system.

The invention claimed is:

1. An automotive interior element comprising a polypropylene composition comprising (percent by weight):
    A) from 60% to 90% of a propylene homopolymer having:
        (i) a polydispersity Index (P.I.) value of from 3.5 to 10.0;
        (ii) a fraction insoluble in xylene at 25 ° C., higher than 90%; and
        (iii) a MFR L (Melt Flow Rate according to ISO 1133, condition L, i.e. 230° C. and 2.16 kg load) from 50 to 200 g/10 min; and
    B) from 10% to 40% of a copolymer of propylene and ethylene, wherein the copolymer of propylene and ethylene has from 30% to 60% of ethylene derived units;
    the polypropylene composition having an intrinsic viscosity of the fraction soluble in xylene at 25° C. between 2.5 and 4.0 dl/g; a MFR L (Melt Flow Rate according to ISO 1133, condition L, 230° C. and 2.16 kg load) from 15 to 100 g/10 min; and an Izod impact strength measured at 23° C. from 5 to 20 kJ/m2.

2. The automotive interior element according to claim 1, wherein the polypropylene composition has an oligomer content, measured in the ex reactor polymer, lower than 5000 ppm.

3. The automotive interior element according to claim 1, wherein the polypropylene composition has an oligomer content measured in the ex reactor polymer, lower than 4000 ppm.

4. The automotive interior element according to claim 1, wherein the propylene composition comprises from 70% wt to 85% wt of component A) and from 15% wt to 30% wt of component B).

* * * * *